United States Patent [11] 3,610,380

[72] Inventor William W. Montalvo, III
 Montvale, N.J.
[21] Appl. No. 853,164
[22] Filed Aug. 26, 1969
[45] Patented Oct. 5, 1971
[73] Assignee Montalvo and Company, Inc.
 Hackensack, N.J.

[54] COUPLING WITH PIVOTALLY MOUNTED MOTORS AND FRICTION ELEMENTS
 3 Claims, 5 Drawing Figs.
[52] U.S. Cl. ..................................................... 192/85 AA,
 192/70.13, 192/111 A, 188/73.6, 188/71.8, 188/196 B
[51] Int. Cl. ..................................................... F16d 25/00
[50] Field of Search ........................................... 188/72.5,
 73.6; 192/70.13, 85 AA, 110 R

[56] References Cited
 UNITED STATES PATENTS
2,435,368 2/1948 Sadler ........................ 192/85 AA

| 3,051,272 | 8/1962 | Burnett ........................ | 188/73.6 |
| 3,081,843 | 3/1963 | Dotto et al. ................... | 188/73.6 |
| FOREIGN PATENTS | | | |
| 931,549 | 12/1959 | Great Britain ................ | 188/73.6 |
| 956,559 | 8/1960 | Great Britain ................ | 188/73.6 |

Primary Examiner—Benjamin W. Wyche
Attorney—Albert M. Parker

ABSTRACT: A mechanism for frictionally coupling two relatively rotatable elements, suitable for use as a brake or as a clutch. A cage casting carries a plurality of opposed fluid-actuated piston-cylinder assemblies adapted to engage both sides of a relatively rotatable disk secured to a hub surrounded by the casting. The housings of the piston-cylinder assemblies can be swung out away from the casting for easy maintenance, and a spring mechanism for selectively retarding the retraction of the pistons serves to adjust the position of the friction elements automatically, compensating for wear.

INVENTOR
WILLIAM W. MONTALVO III
BY
ATTORNEY

INVENTOR
WILLIAM W. MONTALVO III
BY
ATTORNEY

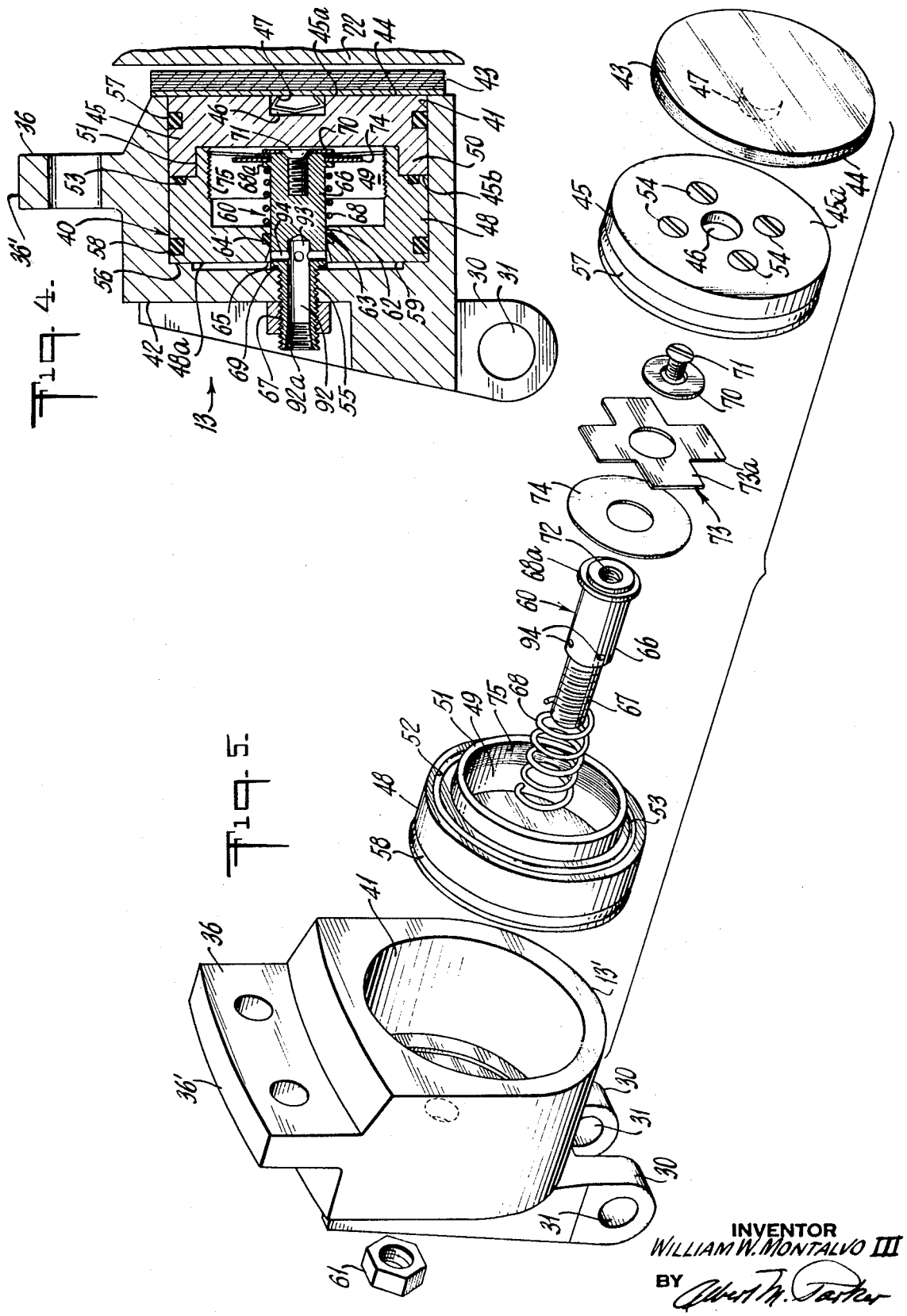

3,610,380

COUPLING WITH PIVOTALLY MOUNTED MOTORS AND FRICTION ELEMENTS

FIELD OF THE INVENTION

The invention is in the field of friction coupling mechanisms for relatively heavy machinery. Such mechanisms include brakes, wherein a rotatable element is frictionally coupled to a relatively nonrotatable element, and clutches, wherein two relatively rotatable elements are coupled and uncoupled. In particular the invention is concerned with the friction coupling of the driving and driven members of machines such as heavy presses.

BACKGROUND OF THE INVENTION

In the prior art brakes and clutches have been made incorporating one or more frictional elements which are selectively applied to one or both sides of a friction plate. Where friction elements are applied to both surfaces of a relatively rotatable plate the friction elements are subjected to severe wear and tear and tend to decrease in their frictional effect due to undesirable unevenness of application to the plate surface. In the caliper-type clutch, or brake, friction elements are applied to limited areas on opposite sides of a rotatable disk. Maintenance and alignment of the friction elements of such caliper coupling mechanisms have given rise to serious difficulties, especially in coupling mechanisms which are fluid actuated. One special problem arises from the fact that for quick engagement the friction elements must be close to the disk when not engaged so that upon actuation they will only have a short distance to travel before contacting the disk. However the friction elements tend to wear down with use, increasing the distance between their surface and the disk surface. In the past frequent adjustment was required. The mechanism of the present invention provides a solution to these problems.

SUMMARY OF THE INVENTION

The present invention relates to a caliper action fluid-actuated friction coupling mechanism in which a plurality of friction members is mounted on opposed pistons slideable in pairs of opposed aligned cylinders for the application of frictional pressure to opposite sides of a disk. The piston-cylinder assemblies are mounted in pivotable housings which can be swung outwardly away from a working position near the disk for easy inspection and maintenance. A novel retarding device in each piston-cylinder assembly prevents undesirable misalignment or displacement of the friction members. The piston-cylinder assemblies are self-adjusting, automatically compensating for wear, to be always in the proper position for most effective action. This arrangement, although illustrated as embodied in a clutch mounted to selectively engage a rotary shaft and a drive belt, may be also used in a clutch in connection with a flywheel, and is also suited for in-shaft drive because of its compactness. It will be obvious that the mechanism may also be used in a brake for engaging a stationary body with a rotatory member.

OBJECTS OF THE INVENTION

The invention has an object the provision of an effective and easily maintained fluid-actuated frictional coupling mechanism.

Another object of the invention is to provide an arrangement for the self-adjustment of friction elements in a coupling mechanism.

A further object is to provide a friction coupling mechanism having a piston-cylinder assemblies which can be swung out from the mechanism for maintenance or replacement of parts.

Other objects and advantages of the invention will appear from the following detailed description of the invention, and from the accompanying drawings illustrating a preferred embodiment of frictional coupling mechanism in accordance with the invention.

In the drawings, in which like reference characters indicate like parts throughout:

FIG. 4 is an enlarged cross-sectional view of the cylinder and piston assembly taken along lines 4—4 of FIG. 1 and looking in the direction of the arrows.

FIG. 5 is an exploded perspective view of the piston-cylinder assembly shown in FIG. 4.

Figure 1:
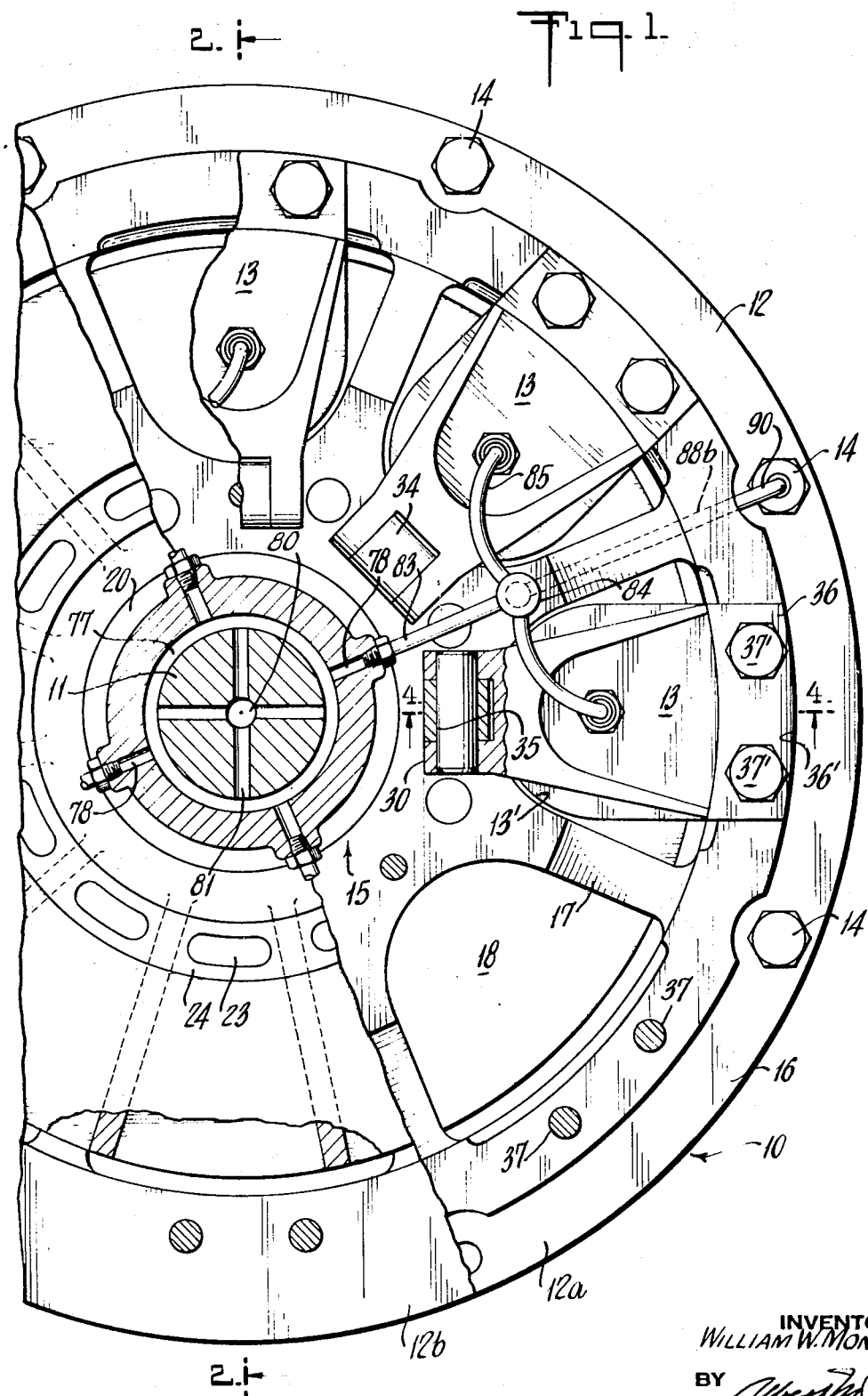
FIG. 1 is a view of a coupling mechanism according to the invention taken across the axis of the shaft and with parts broken away to show internal elements.

Reference is made to FIG. 1 for an overall view of the mechanism of the invention adapted for use as a clutch. The clutch, generally indicated by the reference character 10, is operable to selectively frictionally couple a rotatable cylindrical shaft 11 to a relatively rotatable cage casting 12. Thus if either the cage casting 12 or the shaft 11 is being driven, the engagement of the clutch 10 will operate to cause the other of the relatively rotatable parts to move in unison. Disengagement of the clutch 10 allows either member to rotate without rotating the other.

Figure 2:
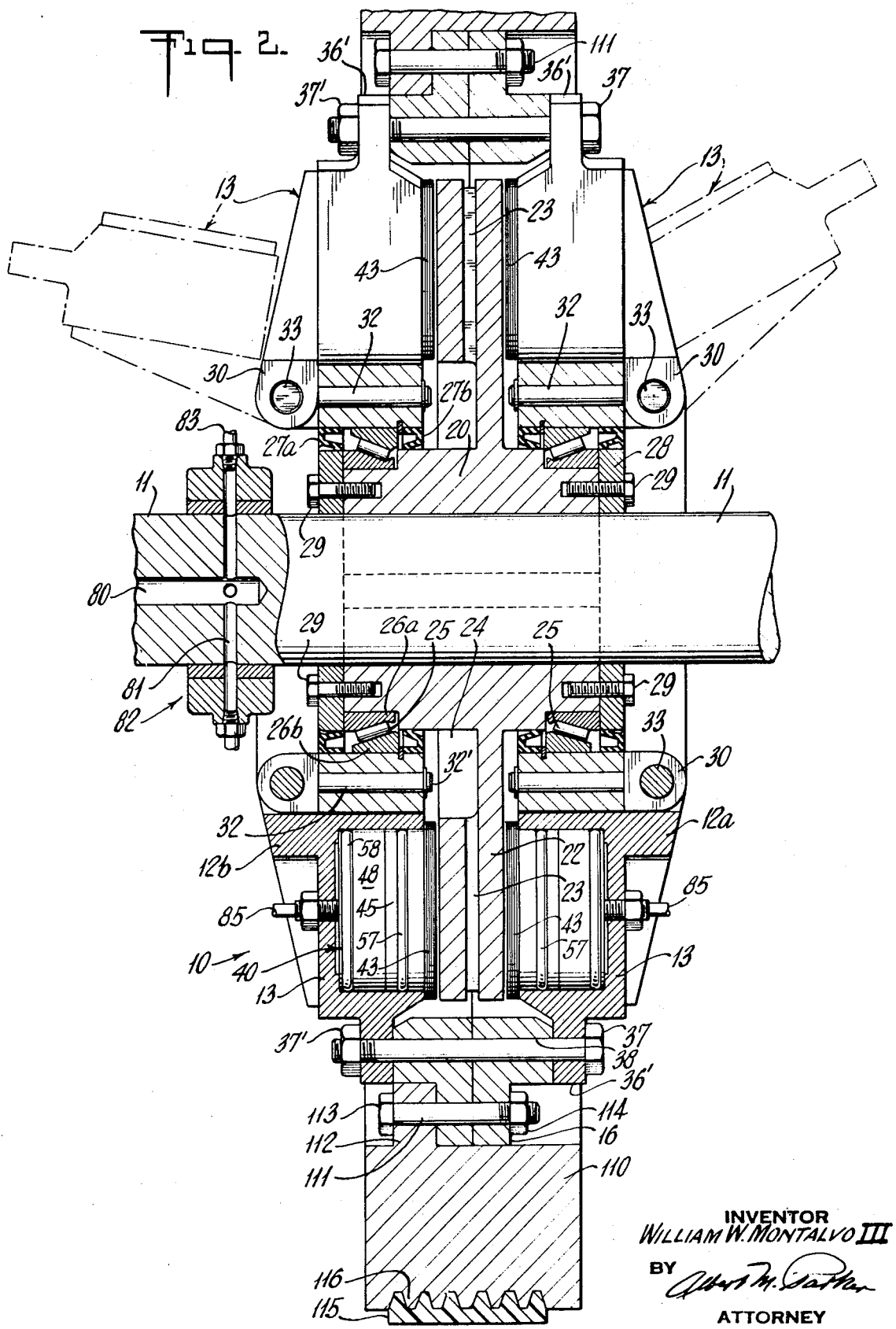
FIG. 2 is a cross-sectional view of the embodiment of FIG. 1 taken along lines 2—2 of FIG. 1 and looking in the direction of the arrows.
Figure 3:
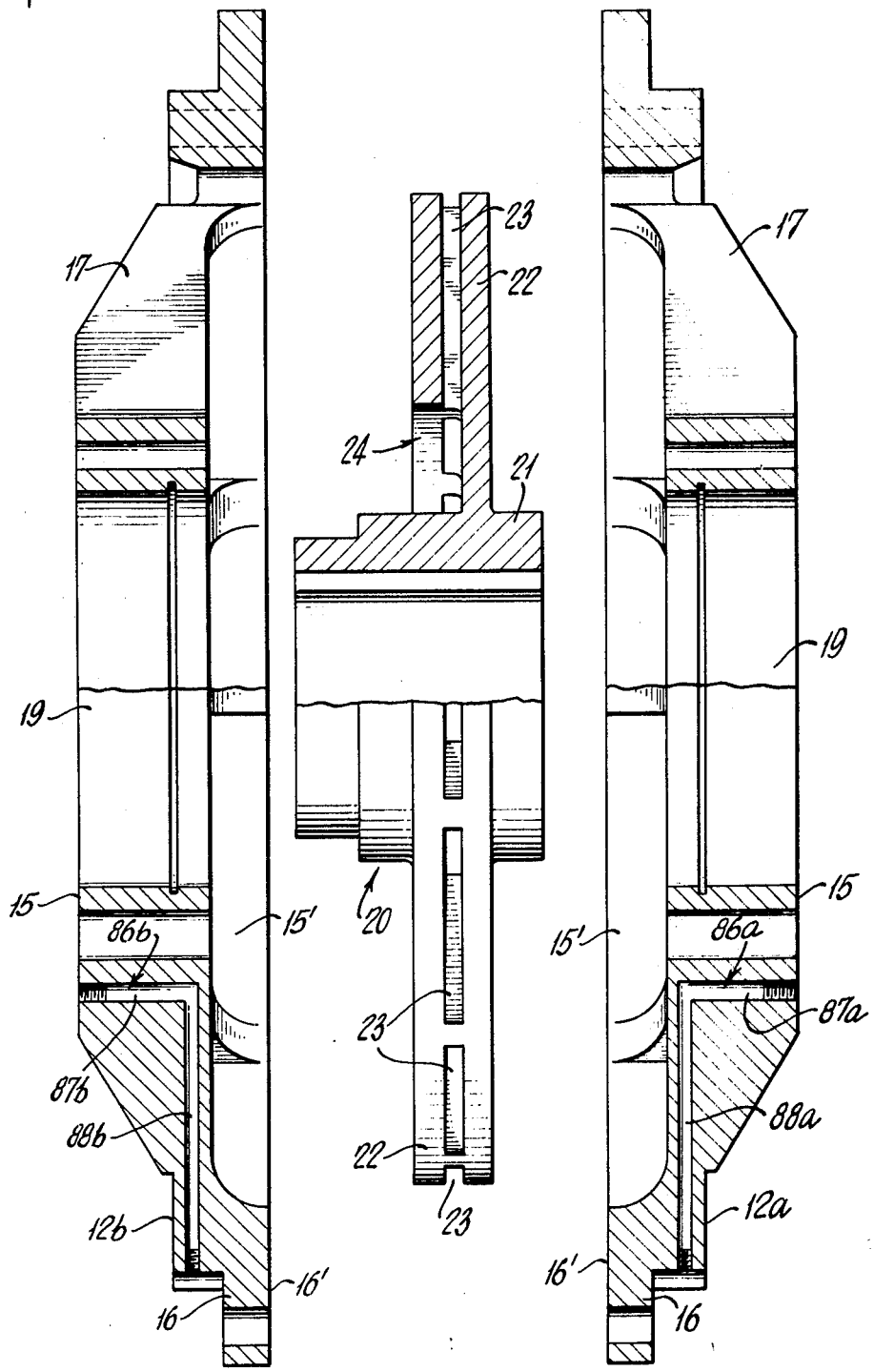
FIG. 3 is an exploded sectional view of the rotor and cage casting of the invention.

The cage casting 12 comprises two identical wheellike cage halves 12a and 12b, FIGS. 1–3, each having central portions 15, annular rim portions 16 and angularly spaced, radially extending spokelike parts 17 connecting the central portions 15 to the rim portions 16. The central portions 15 are thicker than the rim portions 16 and are dished out. The cage halves 12a and 12b are positioned back to back so that the flat inner sides 16' of the rim portions 16 lie against each other and the dished out portions 15' of the central portions 15 lie spaced from each other. Angularly spaced connecting bolts 14, FIGS. 1 and 2 extend through aligned bolt holes adjacent the peripheries of the opposed cage halves 12a and 12b to join the halves.

The cage halves 12a and 12b have aligned circular central apertures 19 extending through their central portions 15 to receive the shaft 11, the axis of which is perpendicular to the plane in which the joined cage halves 12a and 12b meet. Henceforth, unless otherwise indicated, references to parts of the cage casting 12 refer to the like parts of both halves 12a and 12b.

In order to minimize the flywheel effect of centrifugal force arising when the cage casting 12 rotates, the casting 12 is made as light as is commensurate with the required strength. The spoked wheel form of the cage halves 12a and 12b provides a light, yet strong, structure. In the illustrated embodiment there are eight spokelike parts 17 in each cage half. Between the spokelike parts 17 are eight apertures or openings 18, each of which has a generally rounded triangular shape with its rounded apex pointing toward the shaft 11.

Mounted in each of the openings 18 in both of the identical halves of the cage casting 12, is a piston-cylinder assembly in a housing generally indicated at 13. Although in the embodiment illustrated there are 16 piston-cylinder assemblies in their housings 13, or eight opposed pairs, any other suitable number of opposed pairs of assemblies could be used. The number of openings in the cage casting could be reduced accordingly and some of them could be just be left vacant.

Referring now to FIGS. 2 and 3 showing the clutch 10 is cross section, it can be seen that secured to the shaft 11 is a rotor casting 20. The rotor 20 may be simply keyed to shaft 11 to rotate with the shaft 11 or secured thereto by some other suitable means. As shown in FIG. 3, rotor 20 has an annular sleevelike hub 21 integrally formed with a radially extending disk 22. The rotor 20 is surrounded by the cage casting 12 and lies within the space afforded by the dished out central portions 15' of the cage 12.

To avoid an undesirable flywheel effect the disk 22 is formed with radial channels 23 extending at uniformly spaced locations from near the hub 21 to the periphery of the disk thereby decreasing the mass of the disk. These channels also have the effect of avoiding excessive buildup of heat of friction in the disk 22 by allowing streams of cooling air drawn by a centrifugal pumping effect to pass through the disk 22 as it rotates. The channels 23 open from an annular cutout well 24 in the disk 22 surrounding the hub 21 on one side of the rotor 20.

Also shown in FIG. 2 are bearings 25 which positioned between inner and outer races 26a and 26b having inclined surfaces upon which the bearings 25 may roll. The races 26a and 26b are secured to the hub 21 and to the cage casting 12 respectively. The bearings 25 permit free rotation of the relatively rotatable clutch parts with respect to each other when the clutch is not engaged. Inner and outer circular bearing seals 27a and 27b enclose the paths travelled by the bearings 25. Annular end plates 28, secured to the hub 21 by bolts 29, cooperate with the track members 26a and the outer bearing seals 27a to cover bearings 25 and close the portion of the mechanism around the shaft 11.

Referring now to FIG. 2 it can be seen that the piston-cylinder housings 13 are swingable outwardly to positions indicated by the shadow lines of the drawing. Each housing 13 is pivotally secured by means of a boss and shank to the central portion 15 of cage casting 12. For this purpose each housing 13 has two radially inwardly extending spaced parallel ears 30, best seen in FIG. 5. The ears 30 are formed as smoothly tapered extensions of the body of the housing 13 and are rounded at their inner ends to permit swinging on the pin 33, the ends of which are fitted in bores 31 in the ears 30, as shown in FIG. 1. The central portion of pin 33 is journaled in a bore 35 extending through a block 34 mounted on central portion 15 of the cage casting 12 by means of a pin 32 to lie between the lap 30. The pin 32, extends through a bore in the cage casting 12 and is held in place by a locking ring 32' and acting against the inner wall of the cage casting 12.

The radially inner portions of the housings 13 from which the ears 30 extend are rounded at 13' to fit freely within the rounded apices of the generally triangular holes 18 in the cage casting 12. The radially outer flange portions 36 have an arcuate profile 36' concentric with the circle formed by the rim 16 of the cage casting 12. The flanges 36 have two spaced boltholes therethrough which receive elongated bolts 37. The bolts 37, as shown in FIG. 2, pass through aligned holes in the flanges 36 of paired up opposed housings 13 carried respectively on cage halves 12a and 12b. The cage halves are formed with suitable holes 38 to receive the bolts 37 therethrough. The heads of bolts 37 are all on one side of the cage 12 and nuts 37' are secured on the bolts all at the opposite side of the cage. Thus, when it is desired to swing out a piston-cylinder housing 13 for inspection or maintenance of the friction elements it is only necessary to remove nuts 37' from two of the bolts 37, withdraw the bolts 37 and pivot the housing 13 outwardly away from the disk 22 about its pin 33.

Referring now to FIGS. 4 and 5, showing the self-adjusting piston-cylinder assembly with its housing 13 in detail, it can be seen that a cylindrical piston, generally designated by the reference numeral 40, is snugly yet slideably received in a cylinder 41. The cylinder 41 is formed as a smooth walled borehole in the housing 13, with a rear wall 42 of the housing 13 serving as the cylinder head and closing one end of the cylinder. The housing 13 is preferably integrally formed, but may be of several joined parts if desired. At its other end the cylinder 41 opens outwardly toward disk 22 to permit movement of the piston 40 toward and away from the surface of the disk 22 for engagement and disengagement of the clutch.

The piston 40 is generally drum shaped and is formed of two mating cup-shaped sections: a front section 45 having a thick flat base 45a which forms the front face of the piston 40; and a rear section 48 having a thick flat base 48a which forms the rear face of piston 40, normally lying adjacent the cylinder head 42. The front and rear sections 45 and 48 mate to form a tightly closed assembly having a central cylindrical cavity 49. A rearwardly directed circular peripheral collar 50 on the front section 45 tightly receives a forwardly directed circular sleeve 51 of a smaller diameter, on the rear section 48. The end face of collar 50 seats against a shoulder 48b of the section 48. The shoulder has a circular groove 52 in the surface thereof receiving an O-ring seal 53 which seats tightly against the end face of the collar 50 to form a seal thereagainst.

Four piston screws 54, FIG. 5, the heads of which are sunk level with the forward face 45a of the front piston section 45, extend through the front section 45 and through central cavity 49 within the piston to be threadably secured within the backwall of the rear piston section 48.

To insure against leakage between the piston 40 and the cylinder wall 41 two other gaskets or seals are provided in grooves around the piston. A seal 57 seats into and encircles the front piston section 45 and a seal 58 seals into and encircles the rear piston section 48. The seals 47 and 48 are preferably U-cup seals.

Friction pads 43 are mounted on the front section 45 of the piston 40, between the base 45a thereof and the disk 22. These overlie the open end of cylinder 41, being of a slightly larger circular area than the cross section of the cylinder. The pads 43 are disc shaped and are formed of durable friction material, such as an asbestos based composition. The pad 43 is advantageously spaced only a small distance away from the surface of the disk 22 to enable quick engagement of the clutch by forcing the pad 43 against the surface of the disk 22. The pad 43 is cemented or riveted to a metal back plate 44 of the same area.

The center of the front face 45l cylindrical well 46, is formed into the piston section 45 through the front face 45a thereof. The sidewall of the well 46 is grooved or serrated to receive and to retain a spiderlike retaining spring 47 whose legs are secured to the backplate 44. Tension on the spring 47 in the well 46 holds the backplate 44 tightly against the front face 45a of the piston 40 so that the backplate 44 and its attached friction pad 43 will follow the motion of the piston, while allowing easy removal of the friction element 43 with its backplate 44 for replacement thereof.

An annular chamber 59 for actuating fluid under pressure is provided between the rear wall 42 and the base 48a of the rear piston section 48. The chamber 59 is formed by an annular surrounding stepped portion 56 of the cylinder head 42 which positions the piston face 48a away from the inner part of the rest of the cylinder head.

A center stud 60 has a cylindrical shank portion 66 extending axially from front to rear of the cavity 49 in the piston 40 and through a bore 62 in the base 48a of rear piston section 48. A seal 63 is disposed in a groove 64 recessed from the bore 62 and engages the shank 66 to prevent leakage along the bore.

From the rear end of the shank 66 the stud 60 continues in a bored out threaded conduit portion 67 of reduced diameter. The portion 67 is threaded into and through a mated opening 55 extending through the cylinder head 42. The threaded connection is made up tight so that an O-ring seal 69 seated in the shoulder between the shank 66 and the threaded portion 67 makes a tight seal against the inner face of the cylinder head 42. A lock nut 61 is received on the extending portion of the threaded portion 67 and is tightened up against the outer surface of the cylinder head 42.

The bore 92 in the threaded conduit portion 67 is internally screw threaded adjacent its outer end at 92a for the reception of a pipe nipple referred to hereinafter. The inner end of the bore 92 extends to a position 93 well into the shank 66. Just inside that shank the bore 92 communicates with radial bores 94 which extend outwardly through the shank into communication with a conical passage communicating with the chamber 59. In this way fluid under pressure can be introduced into the chamber 59 to force the piston 40 forward.

A retracting spring 68, is coiled around shank 66 and abuts at one end against the rear wall 48a of rear piston section 48, and at the other end against a flange 68a extending out around the shank 66 near its outer end. This spring is ordinarily under compression and so tends to push the piston back in the cylinder, or to the left as seen in FIG. 4. This action retracts the piston 40 when the fluid pressure in chamber 59 is relieved.

A cross-shaped resilient spring 73 is mounted on the shank 66 adjacent its outer end by means of a center hole which fits slidably on that shank. The spring 73 is positioned axially by means of a rigid arrest washer 74 which seats against the flange 68a and a smaller clamping washer 70 which is carried by a clamp screw 71 screwed into a tapped hole in the outer end of the shank 66. The washer 70 has a diameter sufficiently larger than that of the shank 66 to hold the spring 73 in place but without interfering with its spring action. The screw 71 has its head countersunk into the washer 70 and into the material of the shank 66 behind the washer.

The arrest washer 74 is large and stiff enough to prevent the crossarms 73a of the spring 73 moving rearward but leaves them free to spring forward.

The inner surface of the forward piston section 48 within flange 51 thereof is formed with circumferential grooves 75 as best shown in FIG. 4. The ends of spring arms 73a engage in the grooves 75 but can jump from one to the next if the piston is moved far enough forward. This arrangement, as will be described, renders the piston cylinder assembly 13 self-adjusting, so that despite wear on the friction pad 43 reducing its thickness, the forward surface of the pad 43 is always maintained the desired small distance from the disk 22 for rapid, even action in engaging the clutch. The bolts 54 which hold the sections of the piston together pass between the arms 73 without touching them.

Upon actuation of the piston 40 by hydraulic or pneumatic pressure, the piston moves forward and the friction pad 43 is forced into frictional contact with the disk 22. The rear wall 48a of the piston section 48 moves forward with respect to the fixed shank 66 so compresses the retracting spring 68. At the same time the washer 70 restrains the center of the retarding spring 73 forward motion.

The arms of 73a of spring 73 however, having their ends engaged in a groove 75, are bent forward by the piston movement. When the hydraulic pressure in the chamber 59, is relieved, the force of the retracting spring 68 pushes the piston rearward within the cylinder and the retarding spring 73 normally returns to its unstressed position. However, when the friction pad 43 has become somewhat worn, and its thickness has been decreased, the distance which the piston will be advanced to press the pad 43 effectively against the disk 22 increases. Thus, on sufficient advance the groove 75 engaging the arms 73a of retarding spring 73 will move these arms so far forward that their ends will skip resiliently into the next rearward groove 75. Then, when the piston is retracted by the spring 68 the retarding spring 73 will return to its substantially flat position. The arrest washer 74 prevents the arms 73a from being bent backward, so their ends remain in the groove 75 and the spring 73 restrains the piston from being retracted to its original position since the retarding action of the spring 73 is greater than the retracting action of the spring 68. The piston is thus held in a slightly advanced position, so that the extra gap between the pad 43 and the disk 22 created by wear of the pad is eliminated. This automatic adjusting action is repeated whenever frictional wear on the pad 43 increases the distance the piston has to move forward to an equal or greater extent than the spacing of the grooves 75. The arms 73a of the spring 73 will be snapped back to the next groove on each adjustment. Each piston continues to adjust itself until its pad 43 is worn out and must be replaced.

To replace a pad 43 the housing 13 of the piston carrying the pad is pivoted out as described above, making access to and removal of the pad 43 easy. When the pad 43 has been replaced the retarding spring 73 is manually reset to the position, where the pad extends forward to the proper position. This self-adjusting arrangement keeps the faces of all the friction pads 43 the desired small distance from the surface of disk 22 for quick even effective engagement of the clutch.

Having set forth in detail the structure of the friction coupling and automatic adjusting mechanism of the invention, the piping carrying fluid for actuating the pistons will now be described. Although in the description to follow actuation by hydraulic fluid will be described, it will be obvious to those skilled in the art that some other fluid medium, such as a gas or air under pressure can be utilized in essentially the same manner for actuation of the coupling mechanism, of the invention. As best shown in FIG. 2, hydraulic fluid is led to the clutch under pressure through an axial channel 80 extending part way along the shaft 11 to a point near the cage casting 12. From this point a plurality of radial bores 81 extend outwardly from the axial channel 80 to a circumferential channel 77. The channel 77 registers with passages 78 extending through a hydraulic transfer seal 82 best shown in FIG. 2.

The seal 82 and shaft 11 are, of course mounted for relative rotation. Pipes 83, four of which are shown, have nipples at their ends screwed into the passages 78 and extend radially therefrom to junction fittings 84 mounted on alternate ones of the spokelike members 17 (see FIG. 1). From the junction 84 sections of flexible pressure tubing lead the fluid to the piston-cylinder assemblies 13 mounted on member 12b and are connected to those assemblies by nipples screwed into the threaded ends 92a of the bores 90.

From each of the junction fittings 84 another branch line 86b for carrying the fluid to the piston assemblies 13 mounted in cage casting member 12a extends inwardly (FIG. 3) in the form of a passage bored through the spokelike part 17. Complementary passages 86a are formed in cage casting member 12a. These passages are L-shaped, having short legs 87a and 87b directed paralleled to the axis of the casting and long legs 88a and 88b extending radially outwardly from the inner ends of the short legs. The radially outer ends of the long legs 88a and 88b adjacent the peripheral portions of the cage casting members 12 are connected by short connecting hoses 90 to axial bores extending through the connecting bolts 14. Thus besides being bolts the members 14 provide passages for fluid from one side of the clutch to the other. The arrangement of flexible tubing 85 from junctions 84 on the right side of the clutch is the same as on the left side as best shown in FIG. 2. Thus the actuating fluid is delivered to the 16 piston cylinder assemblies 13 by a simple arrangement of tubes and passages symmetrically provided on and through both cage casting members 12a and 12b.

Actuation of the clutch of the invention by hydraulic pressure is effected as follows. Pressure imparted to fluid in the channel 80 in the shaft 11 acts through the above-described system of pipes, hoses and passages in the chambers 59 at the rear of each of the pistons 40 to advance all of the pistons simultaneously and force the friction pads 43 against the disk 22. When the pressure is cut off, the pistons 40 are returned to their withdrawn positions by the action of their retracting springs 68.

If the pads 43 are worn sufficiently to cause the pistons 40 to move more than the initially set distance to bring the pads 43 into proper engagement with the disc 22 the ends of the spring arms 73a may be caused to jump into a rearward one of the grooves 75. Thus, due to the restraining action of the washer 74 the arms 73a cannot bend backwards so they will limit the return action of the piston. This restores the proper spacing between the pad 43 and the disc 22 so that all pads will move substantially the same distance when next the pistons are forced forward. Faster and smoother effective clutch action is achieved.

When the pads 43 wear to such an extent that they need to be replaced this is easy to do. The housings 13 are freed by removing the bolts 38. Then they are swung out on their pins 33 to positions as shown in dot-dash lines in FIG. 2. By the insertion of a suitable tool such as a screwdriver beneath the plate 44 (FIG. 4), the holding action of the spring 47 can easily be overcome whereupon the plate with its worn pad 43 is removed and replacement is snapped into place.

FIG. 2 shows the manner in which the clutch 10 may be mounted within a flywheel 110 for belt drive. The flywheel 110 is mounted around the rim 16 of the cage casting 12, to which it is secured by a plurality of bolts 111 which replace the shorter bolts 14 of FIG. 1, and pass through a flange 112 extending inwardly from the flywheel. Flange 112 is positioned offcenter to lie to one side of the rim 16 of the cage 12, with the heads 113 of bolts 111 engaging the flange 112 and with nuts 114 threaded on the ends of the bolts 111 engaging rim 16 of cage casting 12. A notched belt 115 is shown engaging complementary grooves 116 in the flywheel 110.

The clutch 10 may as readily be mounted within a spider for in-shaft drive if desired by bolting the spider to the rim portion 16 of the cage casting 12.

If the coupling mechanism of the invention were used as a brake the cage casting 12 would merely need to be secured by brackets or by other suitable means to a fixed body, such as the frame of a machine with which the brake is used.

The foregoing detailed description of an illustrative embodiment of the invention will suggest numerous modifications, variations and substitutions to those skilled in the art without departing from spirit and scope of the invention.

What is claimed is:

1. A mechanism for frictionally coupling two bodies against relative rotation with respect to each other, comprising, housing means carried by one of said bodies, friction engaging means mounted in said housing means, said friction means including movable parts for engaging frictionally the other of said bodies, and means for pivotally mounting said housing means on said one body for swinging the housing means outwardly away from said other body to permit access to the friction means, said other body being a rotor, said one body being formed with a space therewithin for the reception of said rotor, said rotor being positioned within said space, said rotor having an annular hub adapted to be secured to a shaft and having a disk extending radially from said hub, said friction means including opposed piston assemblies adapted to urge friction members into contact with opposite sides of the disk, said housing means including opposed housings, said housings including cylinders, said piston assemblies being mounted in said cylinders and said opposed housings being pivotably mounted in opposite sense.

2. The mechanism of claim 1 wherein means in the piston assemblies adjust the position of the friction members relative to the disk to compensate for wear on the friction members.

3. The mechanism of claim 1 wherein said piston assemblies are adapted to be activated by fluid under pressure, one set of piston assemblies being directly connected to a source of fluid under pressure, another set of piston assemblies being connected with said source of fluid under pressure by means including passages formed through said one body.